R. C. SIBLEY.
PNEUMATIC TIRE GAGE.
APPLICATION FILED APR. 26, 1910.

1,156,862.

Patented Oct. 12, 1915.
2 SHEETS—SHEET 1.

WITNESSES
H. L. Allen
P. W. Pezzetti

INVENTOR
R. C. Sibley
By Wright Brown Quinby May
ATTYS.

R. C. SIBLEY.
PNEUMATIC TIRE GAGE.
APPLICATION FILED APR. 26, 1910.
1,156,862.
Patented Oct. 12, 1915.
2 SHEETS—SHEET 2.
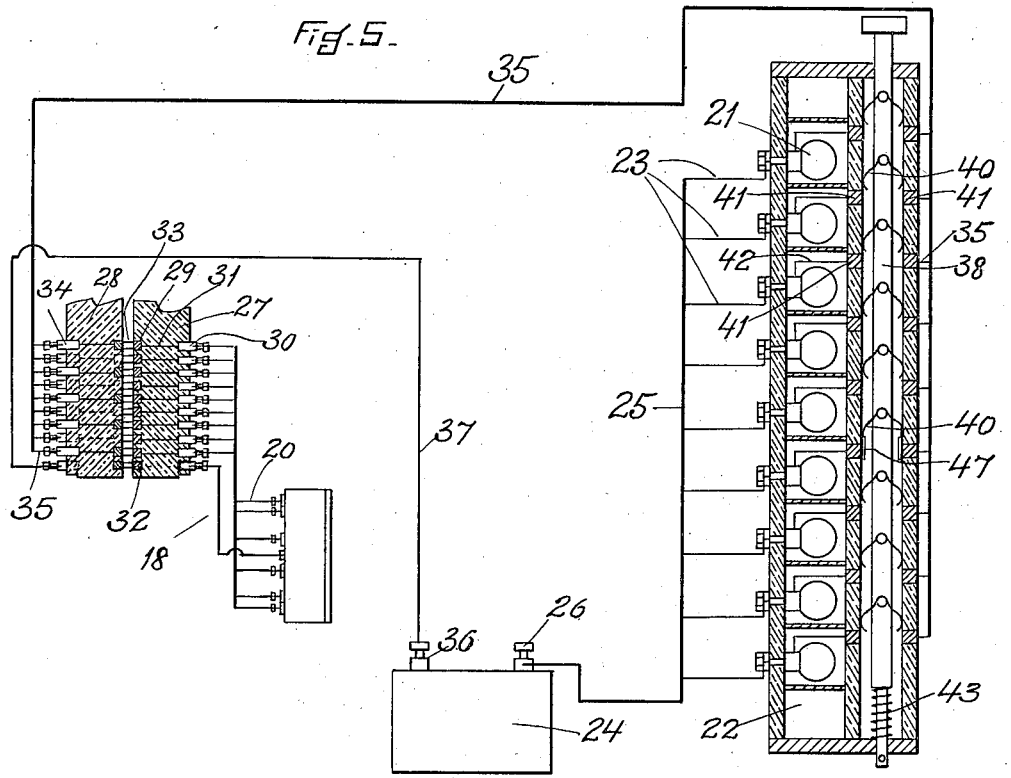
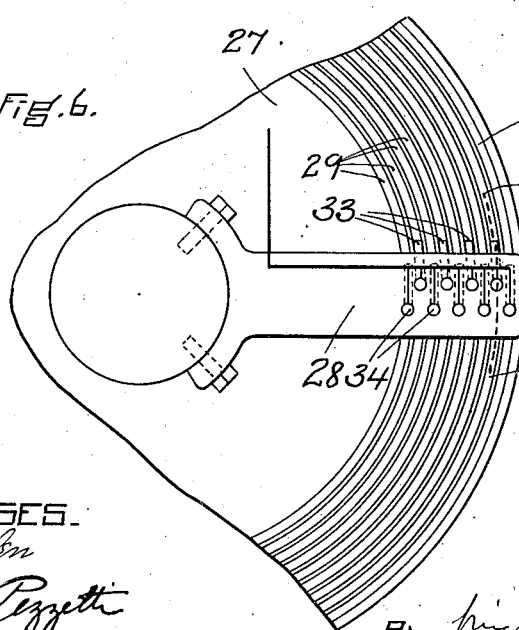
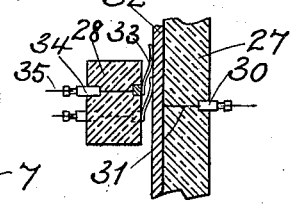
WITNESSES
H. L. Allen
P. W. Pezzetti
INVENTOR
R. C. Sibley
By Wright Brown Quinby May
ATTYS.

UNITED STATES PATENT OFFICE.

RICHARD C. SIBLEY, OF BOSTON, MASSACHUSETTS.

PNEUMATIC-TIRE GAGE.

1,156,862.  Specification of Letters Patent.  Patented Oct. 12, 1915.

Application filed April 26, 1910. Serial No. 557,732.

*To all whom it may concern:*

Be it known that I, RICHARD C. SIBLEY, of Boston, in the county of Suffolk and State of Massachusetts, have invented certain new and useful Improvements in Pneumatic-Tire Gages; of which the following is a specification.

This invention relates to a gage for showing the air pressure in the pneumatic tire of a vehicle wheel, and is especially intended to be used in connection with automobiles, its primary object being to indicate to the driver at any desired time the condition of any of the tires of the automobile. Or the object of the invention may be expressed in another manner as being to provide a means whereby the pressure in any of the tires may be made known to the driver of the automobile without requiring him to leave his seat and when the car is in motion.

The invention consists in a telltale mounted in such a position upon the car that it can be seen by the occupant of the car and a pressure-indicator connected with a tire, and also with the telltale, so that its indications are registered by the telltale. The gage may conveniently be any sort of pressure gage, the telltale is conveniently a series of lights connected so as to be independently illuminated, and the connections between the gage and telltale are preferably electrical and include sliding contacts which permit the gage to be carried rotarily with the wheel to which it is attached while the telltale is fixed to the body of the car.

In the accompanying drawings I have illustrated the preferred form of my invention and the manner in which it is to be used. I have shown only a part of one wheel and one pneumatic gage and telltale, it being understood, however, that duplicates are provided for all of the wheels.

Figure 1:
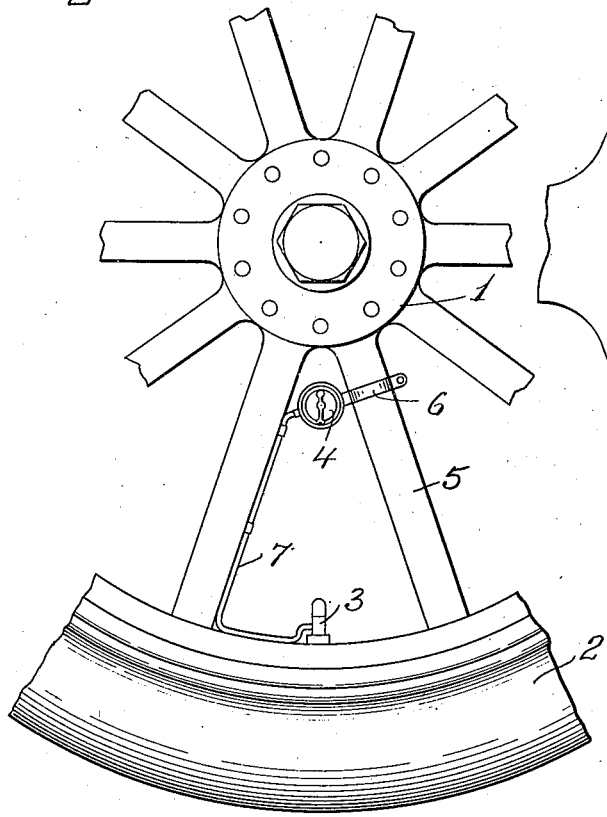
Figure 2:
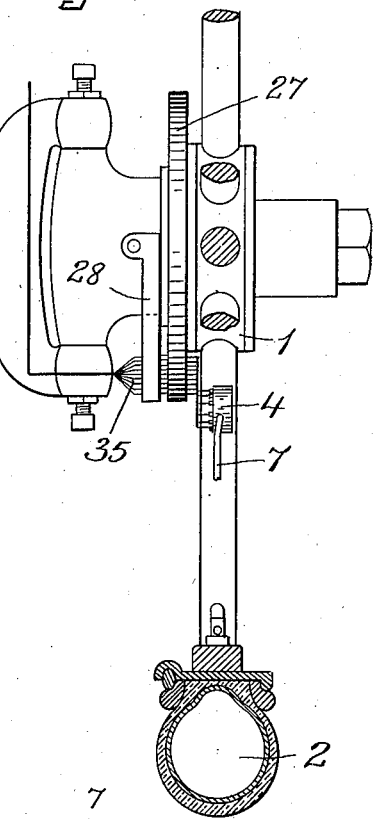
Figure 3:
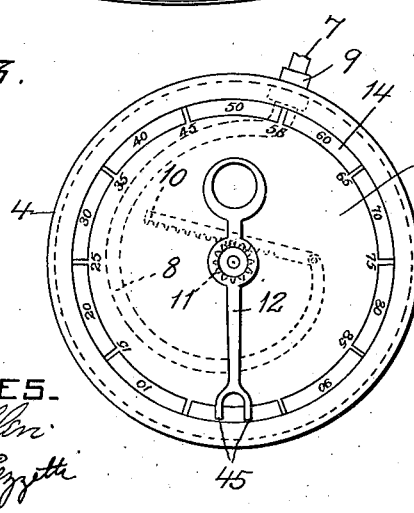
Figure 4:
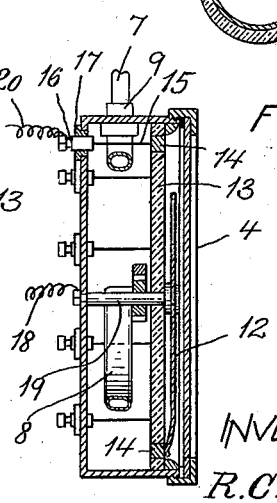

Figure 1 represents an elevation showing part of a wheel with a pressure gage applied thereto. Fig. 2 is a front elevation of the wheel, part of the same being in section showing in addition to the parts illustrated in Fig. 1, the electrical connections for carrying indications from the gage to the telltale. Figs. 3 and 4 are respectively a front elevation and a central section of a form of gage suitable for the purpose. Fig. 5 is a diagrammatic view of the electrical connections between the gage and telltale, the latter being indicated in section. Fig. 6 is a detail elevation of the sliding contacts included in the electrical connections. Fig. 7 is a detail sectional view on the line 7—7 of Fig. 6.

The same reference characters indicate the same parts in all the figures.

One of the wheels of a vehicle such as an automobile is indicated by 1 and the usual pneumatic tire is shown at 2, said tire having a valve nipple 3 of any suitable form through which air is pumped to inflate the tire. 4 represents a gage attached in any convenient manner to the wheel, as by being secured to one of the spokes 5 thereof by a collar or strap 6. This gage is connected with the valve nipple by a tube 7, through which the air is conducted to operate the gage.

Any sort of gage may be used, such for instance as the ordinary Bourdon spring tube gage in common use, one of which is conventionally shown in Figs. 3 and 4. The gage has a curved spring tube 8 connected with a nipple 9, to which the tube 7 is attached. Connections conventionally indicated as a rack 10 and pinion 11 move a pointer 12 rotarily in response to distortions of the spring tube 8 caused by the air pressure. It is to be understood that the particular form of connection between the spring tube and pointer is not in any way material to the present invention, but that any of the forms of mechanism employed in gages now in common use may be used. As will be readily understood the air under pressure in the tire is conducted to the gage and moves the pointer 12 of the latter so as to show, in connection with suitable graduations on the dial, the pressure in the tire to indicate the point at which the tire has been sufficiently inflated, and particularly to show when the air has leaked away beyond a safe amount.

The indications shown directly by the gage may be read by a person standing beside the car and leaning over. My invention has for one of its main objects to render unnecessary the dismounting of a person from a car, in order to read the gage, and particularly to make it possible to learn the condition of all the tires as to the pressure therein, while the car is running at full speed. Accordingly I construct the gage so that it not only shows pressure indications visually, but also acts as a conductor through which electrical currents may flow to cause actuation of an electrical telltale mounted in or upon the body of the car, conveniently on the dashboard thereof. For the purpose of transmitting indications electrically, the dial 13 of the gage is provided with a number of conductor blocks or segments 14, placed near together, but insulated from each other, and from any other parts of the gage which may be of conducting material. Conveniently the dial may be made of a sheet of non-conducting material and the segments 14 inserted in slots or recesses thereof. Each segment is adapted to have a conductor connected with it, being preferably connected by the wire 15 with a separate binding post 16 contained in an insulated bushing 17 in the back wall of the case. The pointer 12 acts as a switch, having its end so shaped and located as to rub over the segments when it is revolved. The pointer is connected with one terminal of an electrical circuit, conveniently by means of a wire 18 connected with the arbor 19 of the pointer, while the segments are independently connected with the other terminal of the circuit through their binding posts 16, to which wires 20 are attached. Thus the segments 14 constitute the terminals or pole pieces of independent circuits or branches of circuits, in each of which an electrically controlled indicator may be included, the several indicators being energized according to the position of the pointer, and the particular segment 14 with which it makes contact. Conveniently the electrically actuated indicators are electric lights 21 which together constitute the telltale. The lamps are mounted in series in a box 22, indicated conventionally in Fig. 5, which is so located upon the dashboard or elsewhere as to be conveniently visible to the driver or other occupant of the automobile. The lamps are connected by wires 23 with a battery or other source of electrical energy 24 through a nipple 25, which is attached to the battery by a binding post 26. It is of course feasible to use instead of the battery a generator, such as the magneto with which most motor cars are equipped.

As the gage is secured to the wheel and revolves therewith, the electrical connections between it and the telltale are made by sliding contacts, one set of which is mounted upon a ring or disk 27 secured to and revolved with the wheel, while the complemental set of contacts is mounted upon a bar 28 attached to the axle or other relatively stationary part of the car. The disk 27 carries a set of contact rings 29, the number of which is equal to the number of segments 14 and the pointer. These rings are insulated from one another and are connected separately with independent binding posts 30 by connections such as the wires 31 which pass through the disk. From each of the binding posts 30 a separate wire 20 leads to one of the binding posts 16 of the gage, these wires being shown in the diagrammatic view of Fig. 5 as collected into a cable for convenience. It will thus be observed that each of the segments 14 is independently connected electrically with one of the contact rings 29. In addition there is another contact ring 32 with which in a similar manner is connected the wire 18 which leads to the pointer 12.

The bar 28 carries a number of brushes 33 equal in number to the rings 29 and 32, said brushes being insulated from each other, and each of them making contact with one of the rings. These brushes are connected with binding posts 34, from which separate conductors 35 lead to the telltale. These wires are indicated in the diagram for convenience as being gathered together into one cable, but it is to be understood that they are insulated from one another. Each of the wires 35 is connected with one of the terminals of one of the lamps 21, the other terminal of such lamp being connected with one of the wires 23. Thus each lamp is in circuit with one of the segments 14, and with only one, the several circuits or branches being distinct from one another. The pointer is connected with the other terminal 36 of the battery or source of electrical energy by a wire 37 in circuit with that one of the brushes 33 which contacts with the ring 32 to which the pointer is connected. From the foregoing it will be understood that in any position of the pointer one of the segments 14 is engaged by the pointer and consequently one of the lamp circuits is made. It is desirable, however, in order to increase the life of the lamps that none of them should remain illuminated all the time, but only when the reading of the gage is desired. For this purpose the lamp circuits are interrupted and an omnibus switch 38 provided for closing the breaks in all of the circuits at once. This omnibus switch is conveniently a rod having a number of spring contacts 40 arranged between contact blocks 41. One of the contact blocks of each pair is connected with one of the lights through a conductor 42, while the other is connected with one of the conductors 35. The contacts 40 are two-armed springs adapted to make contact simultaneously with both contact blocks 41 of the adjacent pair. Normally the switch bar is held by a spring 43 so that the contacts 40 are out of engagement with the blocks 41, but when the bar is moved in opposition to the spring 43 by the occupant of the car, all of the breaks in the lamp circuits between the blocks 41 are closed and the current is allowed to flow through that lamp which is in circuit with the segment 14 with which the pointer 12 may happen to be in contact at that particular instant. The lamps according to their positions indicate the pressures as 10, 20, 30 pounds, etc., the indications being at intervals of several pounds, in order to avoid having too many lamps. In order to enable intermediate readings to be taken I construct the pointer 12 so that when it is approximately midway between the segments, it will make contact with two of them at once and thus illuminate two lamps. For this purpose the contacting end of the pointer is forked and has two branches 45 adapted to bridge the space between any two adjacent contacts. Thus readings intermediate those for which the segmental contacts 14 are calibrated may be taken. If it be assumed for example that the segments 14 are arranged at successive 10-pounds intervals on the dial, then each light when singly illuminated would represent a difference in pressure of 10 pounds more or less than the next adjacent light. If, however, two adjacent lights are illuminated at once, as for instance the lights representing 20 and 30 pounds, it will be understood that the pointer is intermediate the 20 and 30-pound indicating positions and that the pressure is approximately 25 pounds. By this means the range of readings possible is increased to double the number of lights employed.

It may be desirable at times to have the telltale show instantly when the pressure in the tire has dropped below a safe amount, or to the limit of safety. For this purpose I construct one of the sliding contacts 40 on the omnibus switch with extensions 47, so that it will be in contact always with its complemental contact blocks in all positions of the switch. Thus when the pressure has so far fallen in the tire that the pointer makes contact with the segment in circuit with this particular contact, the lamp in the same circuit is instantly illuminated and the driver is warned of the danger in time to reinflate the tire. Most of the tire trouble encountered arises mainly from gradual leakage and loosening of the tire so that it slips on the wheel and cuts the valve, or itself becomes cut, chafed or stretched, rather than from sudden blowouts. My invention is therefore of especial value in giving warning before the pressure has so far diminished as to enable creeping of the tire, with its consequent ill effects, to occur. Thus incipient trouble may be corrected by prompt inflation of the tire before opportunity has occurred for more serious trouble to develop.

I desire it to be understood that I do not limit myself to the employment of electric lights as the indicating parts of the telltale device, but I may use any form of indicator or telltale having parts which are severally energized according to the position of the gage indicator to produce corresponding indications of the telltale.

Any suitable gage or equivalent device may be used, with or without indicating dial or hand, but having an indicating member and so constructed as to effect connection between this pressure actuated member and the electrically energized wires, and any suitable equivalent methods and devices may be used to effect connection of the wires, through proper contact points at the hub of the wheel with the body of the car, and onto the gage on the dashboard; and for the purposes of indication any suitable kind of indicator or gage may be used and located on the dashboard or elsewhere.

I claim,—

1. The combination with a vehicle wheel, and a pneumatic tire on said wheel, of means for indicating the pressure in the tire, comprising a telltale adapted to be mounted on the body of a vehicle to which said wheel is attached, a pressure gage secured to the wheel and connected with the tire, said gage including an indicator movable in response to changes of pneumatic pressure, an electric circuit with which said indicator is connected, a series of separate contacts with which said indicator is adapted to make contact, and separate branch circuits in which said contacts are connected with the telltale, each branch circuit including a pair of slip contacts, one of which is relatively stationary and the other of which is carried by the wheel.

2. The combination with a vehicle wheel, the axle on which said wheel is mounted, and a pneumatic tire on said wheel of a telltale for indicating a pressure in the tire comprising a series of electrically actuated elements adapted to be mounted on the vehicle to which said wheel is attached, a pressure gage secured to the wheel and connected with the tire and having an indicator movable in response to changes of pneumatic pressure and electric contact pieces arranged so as to be successively brought in contact with said indicator when the latter is so moved, a plurality of branch circuits each connected to one of said contact pieces and to one of said telltale members, and said branch circuits including complemental sliding contact members secured to the wheel and the wheel axle respectively.

In testimony whereof I have affixed my signature, in presence of two witnesses.

RICHARD C. SIBLEY.

Witnesses:
Jas. H. Churchill,
Arthur H. Brown.